United States Patent [19]

Blount

[11] 4,086,326

[45] Apr. 25, 1978

[54] PROCESS FOR THE PRODUCTION OF ALKALI METAL CYANIDE SILICATE COMPOUNDS AND CYANIDE SILICATE COMPOUNDS

[76] Inventor: David H. Blount, 5450 Lea St., San Diego, Calif. 92105

[21] Appl. No.: 801,819

[22] Filed: May 31, 1977

[51] Int. Cl.² .............................................. C01B 33/00
[52] U.S. Cl. .................................... 423/332; 423/325; 423/365
[58] Field of Search ............... 423/325, 332, 335, 351, 423/364, 365; 106/288 B

[56] References Cited

U.S. PATENT DOCUMENTS 4,022,873  5/1977  Blount .................................. 423/365

OTHER PUBLICATIONS

Zarfl, as Abstracted by Chemical Abstracts, vol. 73, No. 22 –111461c.

*Primary Examiner*—O. R. Vertiz
*Assistant Examiner*—Thomas W. Roy

[57] ABSTRACT

Hydrated silica and/or silica are reacted chemically with an alkali metal cyanide in a ratio of about 1 mol of hydrated silica or silica to about 1 to 2 mols of the alkali metal cyanide silicate compounds.

11 Claims, No Drawings

PROCESS FOR THE PRODUCTION OF ALKALI METAL CYANIDE SILICATE COMPOUNDS AND CYANIDE SILICATE COMPOUNDS

CROSS-REFERENCE TO RELATED APPLICATIONS

This application is related to U.S. Pat. Application Ser. No. 701,594, filed July 1, 1976, now U.S. Pat. No. 4,022,873.

BACKGROUND OF THE INVENTION

This invention relates to a process for the production of certain alkali cyanide silicate compounds by chemically reacting hydrated silica ($SiO_2 \cdot xH_2O$) and/or silica ($SiO_2$) with a suitable cyanide compound in a ratio of about 1:1 or 1:2 mols.

The hydrated silica and/or silica may be produced by any of the well known methods, such as adding an acid compound to an aqueous solution of an alkali metal metasilicate, thereby precipitating out the hydrated silica, usually in the form of a gel. The hydrated silica gel may then be air dried at 25° to 95° C.

The hydrated silica may also be produced by reacting an alkaline earth metal metasilicate with a mineral acid, thereby producing a hydrated silica.

The various alkali metal cyanide silicate compounds produced by this process are useful as an intermediate in the production of many organic silicate compounds, such as amine silicates, isocyanate silicates, organic acid silicates, cyanide silicates, organic ester silicates and other organic silicate compounds. The alkali metal cyanide compounds will react chemically with epichlorohydrin to produce useful resins.

SUMMARY OF THE INVENTION

Basically, the process of this invention comprises reacting about 1 mol of hydrated silica and/or silica with from about 1 to 3 mols of an alkali metal cyanide, ammonium cyanide or hydrogen cyanide in an aqueous solution. The solution is preferably heated to the boiling point of the solution to evaporate the solution, leaving a granular product of substituted cyanide silicate compounds and silica. The mixture is further heated for 5 to 30 minutes to a temperature of 150° to 250° C, thereby producing substituted alkali cyanide silicate.

The alkali substituted cyanide silicate compounds may be further reacted with an acid to produce granular cyanide silicate compounds and a salt.

The cyanide silicate and dicyanide silicate compounds are useful as an intermediate in the production of many organic silicate compounds, such as amine silicates, isocyanate silicates, organic silicate acids, organic ester silicates and other organic silicate compounds. The cyanide silicate and dicyanide silicate compounds are useful as fillers in varnishes and paints.

DETAILED DESCRIPTION OF THE INVENTION

While details of the mechanism of the reactions I obtain are not fully understood, it is thought that the basic reaction takes place as follows:

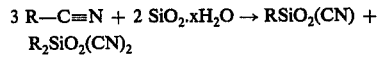

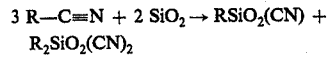

wherein R is an alkali metal, ammonium or hydrogen radical.

When the hydrated silica, and/or silica are chemically reacted with a cyanide compound in the ratio of 1:1 mols, it produces a mixture of cyanide silicate compounds.

While the reactants may be brought into contact in any suitable manner, mixing in an aqueous solution is generally preferred. The reaction may be conducted at any suitable temperature or pressure.

Any suitable cyanide compound may be reacted chemically with hydrated silica and/or silica in the process of this invention. Typical cyanides include sodium cyanide, potassium cyanide, lithium cyanide, cadmium cyanide, cesium cyanide, ammonium cyanide, hydrogen cyanide and other metal cyanides. In general, best results have been obtained with alkali metal cyanides which are therefore preferred. Of these, optimum results are obtained with sodium cyanide and potassium cyanide.

The chemical reaction between hydrogen cyanide and hydrated silica and/or silica appears to be enhanced by the presence of an alkali catalyst. Any suitable alkali catalyst may be used such as alkali metal hydroxides or carbonates, sodium silicate, potassium silicate, alkali metal cyanides, alkaline earth metal cyanides and other alkali compounds. The concentration of the alkali catalyst may vary from 1 to 10 percent by weight of the reactants, hydrated silica and hydrogen cyanide. Sodium carbonate is the preferred alkali catalyst.

While the reactants may be mixed in any suitable proportions, generally approximately stoichiometric proportions are preferred. Thus, the formation of an alkali cyanide silicate or a cyanide silicate will require about 1 mol each of the hydrated silica and/or silica and the selected cyanide compound. Production of a substituted dicyanide silicate will generally require about 1 mol of hydrated silica and/or silica for each 2 mols of the selected cyanide compound. The dry, fine granular hydrated silica and/or silica may be mixed with dry granular alkali metal cyanide then heated to 150° to 250° C while agitating thereby producing alkali metal cyanide silicate compounds.

The substituted cyanide silicates prepared by the novel process described above may be further chemically reacted with suitable organic halides, sulfates and phosphates to form new organic cyanide silicate compounds. The substituted cyanide silicate compounds may also be oxidized by suitable peroxides, may form acid salts by reaction with suitable acids, or may be converted to amine silicates, isocyanate silicates, organic acid silicates, organic ester silicates, organic silicate polymers and other organic silicate compounds.

DESCRIPTION OF PREFERRED EMBODIMENTS

My invention will be illustrated in greater detail in the following Examples which describe various preferred embodiments of the process of this invention. These Examples are merely illustrative of novel processes and do not limit the procedures which may be used in the production of my novel substituted cyanide silicate compounds. Parts and percentages are by weight unless otherwise indicated.

EXAMPLE I

About 70 parts by weight of fine dry granular hydrated silica, about 50 parts by weight of sodium cyanide and about 100 parts by weight of water are mixed. The mixture is heated to about 100° C until the water evaporates, thereby producing light brown granular sodium cyanide silicate, and a small amount of disodium dicyanide silicate.

EXAMPLE II

About 70 parts by weight of fine dry granular hydrated silica, about 120 parts by weight of sodium cyanide, and 200 parts by weight of water are mixed. The mixture is heated to about 100° to 110° C while agitating at ambient pressure until the water evaporates, thereby producing brown granules of disodium dicyanide silicate and sodium cyanide silicate.

About 200% water by weight is added; disodium dicyanide silicate goes into solution and the sodium cyanide silicate remains as brown granules. The solution of disodium dicyanide is filtered off, and the water is evaporated, thereby recovering the disodium dicyanide silicate, brown, soft granules.

EXAMPLE III

About 70 parts by weight of fine granular hydrated silica and about 120 parts by weight of potassium cyanide are mixed then heated to a temperature of 150° to 200° C while agitating at ambient pressure for 10 to 30 minutes, thereby producing a mixture of potassium cyanide silicate and dipotassium dicyanide silicate.

EXAMPLE IV

About 70 parts by weight of a mixture of fine granular hydrated silica and silica and about 120 parts by weight of sodium cyanide are mixed then heated to a temperature of 150° to 250° C while agitating at ambient pressure for 10 to 30 minutes, thereby producing a mixture of sodium cyanide silicate and disodium dicyanide silicate.

About 200% water by weight is added; disodium dicyanide silicate goes into solution and is then filtered off, thereby recovering the sodium cyanide silicate. The solution of disodium dicyanide silicate is heated until the water evaporates, thereby recovering brown, soft granules of disodium dicyanide silicate.

The mixture of sodium cyanide silicate and disodium dicyanide silicate is mixed with a mineral acid, dilute sulfuric acid, until the pH is about 7, thereby producing cyanide silicate, dicyanide silicate and sodium sulfate. The mixture is washed with water to remove the salt, thereby recovering the mixture of cyanide silicate and dicyanide silicate.

EXAMPLE V

About 70 parts by weight of a mixture of fine granular hydrated silica and silica and about 100 parts by weight of sodium cyanide are mixed then heated to a temperature of 150° to 250° C while agitating at ambient pressure for 10 to 30 minutes, thereby producing a mixture of sodium cyanide silicate and disodium dicyanide silicate.

About 170 parts by weight of the mixture of sodium cyanide silicate and disodium silicate and about 100 parts by weight of an amine, diethylenetriamine, are mixed; then about 200 parts by weight of epichlorohydrin in portion of 30 to 50 parts by weight are added while agitating and keeping the temperature between 25° to 70° C at ambient pressure and agitating for 5 to 15 minutes between each addition, thereby producing an epoxy resin, a thick liquid. The resin may be cured by heating to between 80° to 100° C for 1 to 10 minutes or by mixing an amine catalyst such as 30 parts by weight of ethylenediamine with said epoxy resin at a temperature of 25° to 70° C. The resin produced is a hard, tough brown resin. The liquid resin may be poured into molds then heated to 80° to 100° C, thereby producing hard, tough, useful objects.

EXAMPLE VI

About 70 parts by weight of hydrated silica, 120 parts by weight of sodium cyanide and 200 parts by weight of water are mixed. Dilute hydrochloric acid is slowly added to the mixture while agitating at ambient pressure and temperature until the pH is about 7 to 8. The hydrogen cyanide produced reacts chemically with the hydrated silica, and the reaction is complete in 30 to 60 minutes, thereby producing brown granules of cyanide silicate and dicyanide silicate.

The dicyanide silicate is soluble in dilute mineral acid such as dilute sulfuric acid and is filtered off, thereby recovering the cyanide silicate. The dicyanide silicate may be precipitated from the dilute sulfuric acid by adding an alkali compound until the pH is about 7 to 8. The cyanide silicate granules turn blue in an acid solution with a pH less than 6. The cyanide silicate granules may form a salt with the acid to produce the blue color. The cyanide silicate compound is soluble in acetic acid.

EXAMPLE VII

Hydrogen cyanide is passed thru about 70 parts by weight of a mixture of hydrated silica and silica in a ratio of 3 to 1 which has been moist with an aqueous solution containing enough alkali catalyst, sodium carbonate, to give a pH of 8 to 10. A closed system is used and the unused hydrogen cyanide is recycled. The temperature is kept just above the boiling point of hydrogen cyanide and ambient pressure is used. The chemical reaction is complete in about 1 to 2 hours, thereby producing brown granules of cyanide silicate and dicyanide silicate.

The said cyanide and dicyanide silicate, equal to about 1 mol of the silicate, about 2 mols of sodium hydroxide in an aqueous solution are mixed then heated to about 80° to 100° C for 10 to 30 minutes. About one mol of a diamine or polyamine such as diethylenetriamine is added and mixed well; then about 2 mols of epichlorohydrin are added while agitating, and the chemical reaction is complete in 10 to 30 minutes, thereby producing a solid epoxy silicate resin.

EXAMPLE VIII

Sodium cyanide silicate and disodium dicyanide silicate are produced by the following steps:
(a) mixing about 1 part by weight of a fine granular mixture of hydrated silica and silica and 1 to 2 parts by weight of sodium cyanide;
(b) evaporating the water, then heating the mixture to 150° to 200° C while agitating for 5 to 30 minutes, thereby
(c) producing a brown, granular mixture of sodium cyanide silicate and disodium dicyanide silicate.

EXAMPLE IX

Sodium cyanide silicate and disodium dicyanide silicate are separated by the following methods:
(a) adding about 4 parts of water to the sodium cyanide silicate and disodium cyanide as produced in Example VIII; the disodium dicyanide silicate goes into solution;
(b) filtering off the solution of disodium dicyanide, thereby
(c) recovering the brown granules of sodium cyanide.
(d) evaporating the water from the disodium dicyanide silicate, thereby
(e) recovering brown granules of disodium dicyanide.

EXAMPLE X

Cyanide silicate is produced by the following steps:
(a) adding a dilute mineral acid (3N hydrochloric acid) to the sodium cyanide silicate as produced in Example IX until the pH is 7 to 8; then
(b) filtering off the water and sodium chloride, thereby
(c) producing cyanide silicate.

EXAMPLE XI

Dicyanide silicate is produced by the following steps:
(a) adding a dilute mineral acid (3N sulfuric acid) to the disodium dicyanide as produced in Example IX until the pH is 7 to 8;
(b) filtering off the water and sodium sulfate, thereby
(c) producing dicyanide silicate.

EXAMPLE XII

Cyanide silicate and dicyanide silicate is produced by the following steps:
(a) adding about 1 part by weight of fine granular hydrated silica to 0.1 to 10 parts by weight of water;
(b) adding about 1 to 10% by weight of an alkali catalyst sodium carbonate;
(c) adding hydrogen cyanide slowly to said mixture while agitating for 60 to 100 minutes at ambient temperature and pressure until 1 to 2 parts by weight have been added, thereby
(d) producing brown granules of cyanide silicate and dicyanide silicate.

EXAMPLE XIII

Cyanide silicate and dicyanide silicate as produced in Example XII are separated by the following steps:
(a) adding dilute sulfuric acid to the mixture of cyanide silicate and dicyanide silicate while agitating for 10 to 20 minutes, and the dicyanide silicate goes into solution;
(b) filtering off the solution of dicyanide silicate, thereby
(c) recovering blue granules of cyanide silicate hydrogen sulfate;
(d) adding an alkali metal carbonate or hydroxide, selected from the group consisting of sodium carbonate, sodium hydroxide, potassium carbonate and potassium hydroxide, to the solution of dicyanide silicate until the pH is about 6 to 8, thereby precipitating brown dicyanide silicate;
(e) filtering off the water and salt, thereby recovering brown dicyanide silicate;
(f) adding an alkali metal carbonate or hydroxide, selected from the group consisting of sodium carbonate, sodium hydroxide, potassium carbonate and potassium hydroxide, to blue granules of cyanide silicate hydrogen sulfate until the pH is about 7 to 8;
(g) washing and filtering off the alkali metal sulfate, thereby
(h) recovering brown granules of cyanide silicate.

I claim:

1. The method of preparing alkali metal cyanide silicate compounds by the following steps:
   (a) mixing together in water about 1 part by weight of fine granular hydrated silica and 1 to 2 parts by weight of an alkali metal cyanide compound selected from the group consisting of sodium cyanide, potassium cyanide, lithium cyanide, cesium cyanide and mixtures thereof:
   (b) evaporating the water, then heating the resulting mixture containing the alkali metal cyanide to 150° to 200° C while agitating for 5 to 30 minutes, thereby
   (c) producing a brown granular mixture of alkali metal cyanide silicate ($RSiO_2CN$) and dialkali metal dicyanide silicate [$R_2SiO_2(CN)_2$], wherein R is sodium, potassium, lithium, cesium, and mixtures thereof.

2. The method of claim 1 wherein the hydrated silica is a mixture of hydrated silica ($SiO_2.xH_2O$) and silica ($SiO_2$).

3. The method of claim 1 wherein silica is used in place of hydrated silica.

4. The method of claim 1 wherein additional steps are added:
   (d) adding water to said granular mixture; dialkali metal dicyanide silicate goes into solution and is filtered off, thereby
   (e) recovering brown granules of alkali metal cyanide silicate;
   (f) evaporating the water from the dialkali metal dicyanide, thereby
   (g) recovering brown granules of dialkali metal dicyanide silicate.

5. The method of claim 4 wherein additional steps are added:
   (h) adding a dilute acid, selected from mineral acids consisting of sulfuric acid and hydrochloric acid, to the alkali metal cyanide silicate until the pH is about 7 to 8, thereby
   (i) producing brown granules of cyanide silicate ($HSiO_2CN$).

6. The method of claim 4 wherein additional steps are added:
   (h) adding a dilute acid, selected from mineral acids consisting of sulfuric acid and hydrochloric acid, to the dialkali metal dicyanide silicate until the pH is about 7 to 8, thereby
   (i) producing brown dicyanide silicate [$H_2SiO_2(CN)_2$] and an alkali metal salt;
   (j) filtering off the water and alkali metal salt, thereby
   (k) recovering brown dicyanide silicate.

7. The method of producing cyanide silicate and dicyanide silicate by the following steps:
   (a) adding about 1 part by weight of fine granular hydrated silica to 0.1 to 10 parts by weight of water; to form a mixture
   (b) adding to said mixture about 1 to 10% by weight of an alkali catalyst, selected from the group consisting of sodium carbonate, sodium cyanide, potassium cyanide, barium cyanide and mixtures thereof; to form a second mixture (c) adding gaseous hydrogen cyanide slowly to said second mixture while agitating for 60 to 100 minutes at ambient temperature and pressure until 1 to 2 parts by weight have been added, thereby (d) producing brown granules of cyanide silicate and dicyanide silicate.

8. The method of claim 7 wherein additional steps are added:

(e) adding a dilute mineral acid, sulfuric acid, to the mixture of cyanide silicate and dicyanide silicate until the pH is about 4 to 5 while agitating for 10 to 20 minutes, and the dicyanide silicate goes into solution;

(f) filtering off the solution of dicyanide silicate, thereby (g) recovering cyanide silicate hydrogen sulfate;

(h) adding an alkali metal carbonate or hydroxide, selected from the group consisting of sodium carbonate, potassium carbonate sodium hydroxide and potassium hydroxide, until the pH is about 7 to 8, thereby (i) recovering cyanide silicate;

(j) adding an alkali metal hydroxide or carbonate, selected from the group consisting of sodium carbonate, sodium hydroxide, potassium carbonate and potassium hydroxide, to the solution of dicyanide silicate until the pH is about 7 to 8, thereby precipitating brown dicyanide silicate;

(k) filtering off the water and alkali metal salt, thereby (l) recovering dicyanide silicate.

9. The products, alkali metal cyanide silicate compounds ($RSiO_2CN$), wherein R is sodium, potassium, lithium, cesium, and mixtures thereof produced by the method of claim 4.

10. The product, cyanide silicate ($HSiO_2CN$) as produced by the method of claim 5.

11. The product, dicyanide silicate [$H_2SiO_2(CN)_2$] as produced by the method of claim 6.

* * * * *